United States Patent [19]

Cueto et al.

[11] 4,417,196

[45] Nov. 22, 1983

[54] CORD SETS WITH POWER-FACTOR CONTROL

[75] Inventors: Agustin Cueto, Westport, Conn.; Daniel E. Robinson, Metuchen, N.J.

[73] Assignee: GK Technologies, Incorporated, Greenwich, Conn.

[21] Appl. No.: 329,420

[22] Filed: Dec. 10, 1981

[51] Int. Cl.³ .................................................. G05F 5/00
[52] U.S. Cl. .............................. 323/210; 339/192 RL; 307/12
[58] Field of Search .................... 307/12, 149, 150; 323/207–210, 217, 267, 300, 905; 339/192 RL

[56] References Cited

U.S. PATENT DOCUMENTS

| | | | |
|---|---|---|---|
| 2,342,503 | 2/1944 | Thompson | 318/810 X |
| 3,523,212 | 8/1970 | Murphy | 323/905 X |
| 4,052,648 | 10/1977 | Nola | 318/810 |

Primary Examiner—William M. Shoop
Attorney, Agent, or Firm—Hopgood, Calimafde, Kalil, Blaustein & Judlowe

[57] ABSTRACT

The invention contemplates a cord set involving a plug unit connected to one end of a multiple-conductor cord or cable, and destined to concurrently serve different electrical loads within a given utilization device. A suitably miniaturized power-factor control circuit is embodied within the plug, so that when plugged into a conventional a-c power outlet receptacle, a first two of the cable conductors can deliver suitably modified voltage appropriate to the instantaneous load requirements served by the modified voltage, while one of these first two cable conductors and a third cable conductor can concurrently deliver voltage appropriate to the different electrical load which it serves.

6 Claims, 5 Drawing Figures

CORD SETS WITH POWER-FACTOR CONTROL

BACKGROUND OF THE INVENTION

The invention relates to applications of so-called power-factor control circuits as power-conservation devices, and in particular to cord sets embodying miniaturized circuits of such nature.

Nola U.S. Pat. Nos. 4,052,648 and 4,266,177 state the problem of power-factor degradation, illustratively involved in reduced-load operation of induction motors, and these patents describe circuits for continuously sensing the phase between voltage and current supplied to a load, and for using the sensed magnitude of this phase relation to so modify the delivered voltage that power-factor degradation is substantially eliminated, thereby effecting a substantial saving in input-energy cost, to operate the utilization device.

In a technical article by Allen, et al., "Power Factor Controller: Its Future Lies in Proper Application", *Appliance Engineer*, October, 1980, beginning at page 70, the authors note that despite the acclaim and publicity given to Mr. Nola's invention as "being one of the most unique and easy solutions to the problem of conservation of energy", and despite passage of three years since its patenting, "the power factor controller has not made significant inroads into the retrofit markets of residential and commerical appliances and industrial machines nor into original equipment manufacture (OEM) markets." The article assesses payback and proper application as key factors contributing to limited acceptance of the power-factor controller.

BRIEF STATEMENT OF THE INVENTION

It is an object to provide improved means whereby advantages of power-factor controllers can be brought to the retrofit and/or OEM markets indicated.

It is a specific object to provide a cord set embodying a power-factor control output suitable for bodily adoption or acceptance by the appliance manufacturer, and suitable for retrofit adaptation by the consumer to his existing machine.

Another specific object is to meet the above objects with a cord set having a standard plug-pin configuration and providing, in its associated output cord connection, wiring suitable to drive one component of a utilization device, such as a household washing machine, with power-factor controlled voltage, and at the same time wiring suitable to drive another component of the same device with a different voltage.

It is a general object to meet the above objects with construction which is externally simple and safe to handle, which is simple to install or retrofit, as the case may be, and which has the capability of justifying its relatively modest cost, through reduced electrical power consumption, in a relatively short period of use.

The invention achieves the foregoing objects and provides further features in a cord set construction involving a plug unit connected at one end of a multiple-conductor cord or cable, destined to separately and differently serve individual electrical loads or categories of loads within a given utilization device. The plug is configured for acceptance by a standard a-c power-outlet receptacle, and a micro-miniaturized power-factor control circuit is embodied within the plug housing. Also embodied in the plug housing are further circuit connections whereby properly machine-connected other ends of conductors in the cable offer power-factor controlled output to one load component (or type of load component) within the utilizaton device, while the other end of at least one different further conductor in the cable enables service supply to another load component within the utilization device.

DETAILED DESCRIPTION

The invention will be illustratively described in detail in conjunction with the accompanying drawings, in which.

Figure 1:
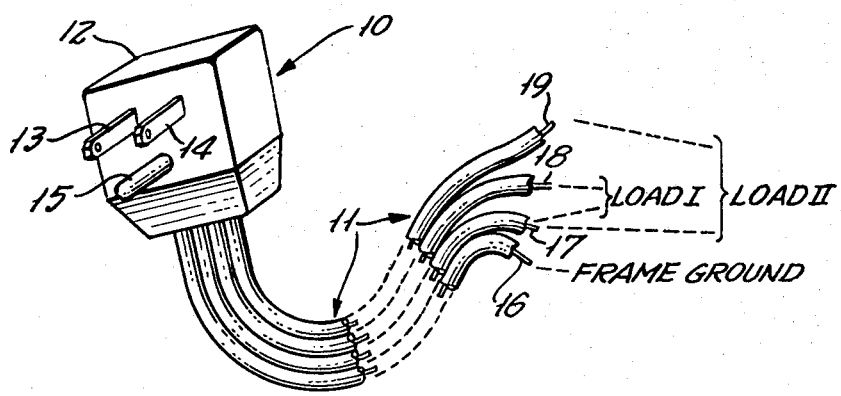
FIG. 1 is a perspective view of a cord set of the invention.
Figure 2:
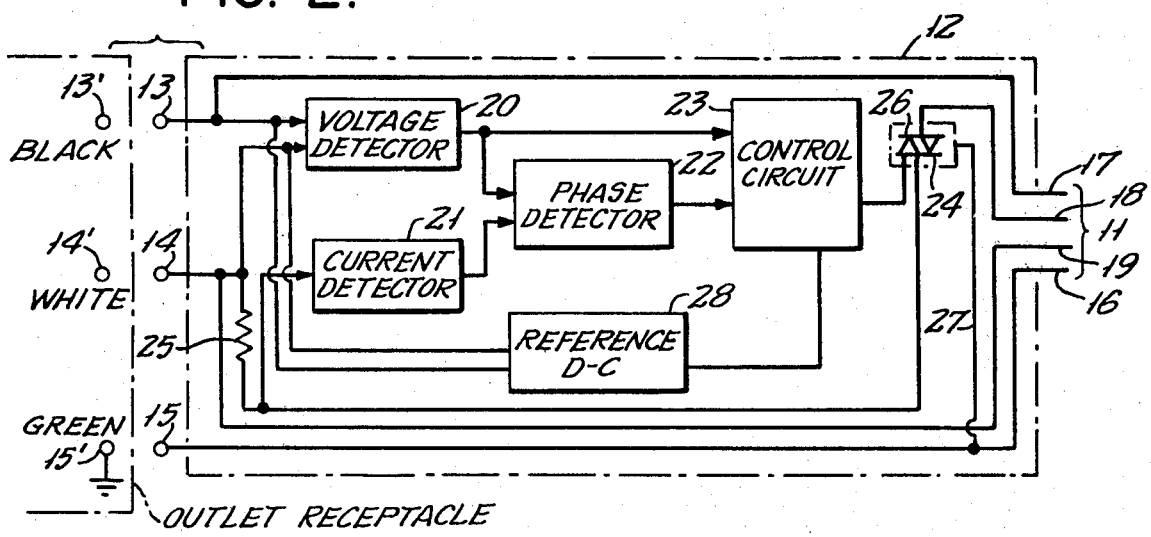
FIG. 2 is an electrical block diagram of components of the cord set of FIG. 1.
Figure 4:
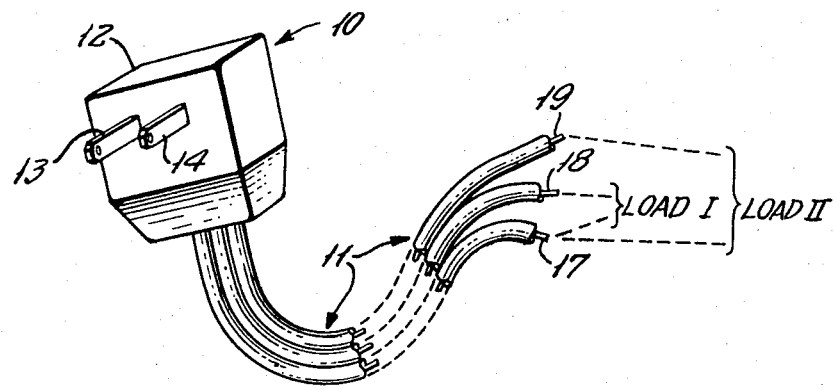
Figure 5:
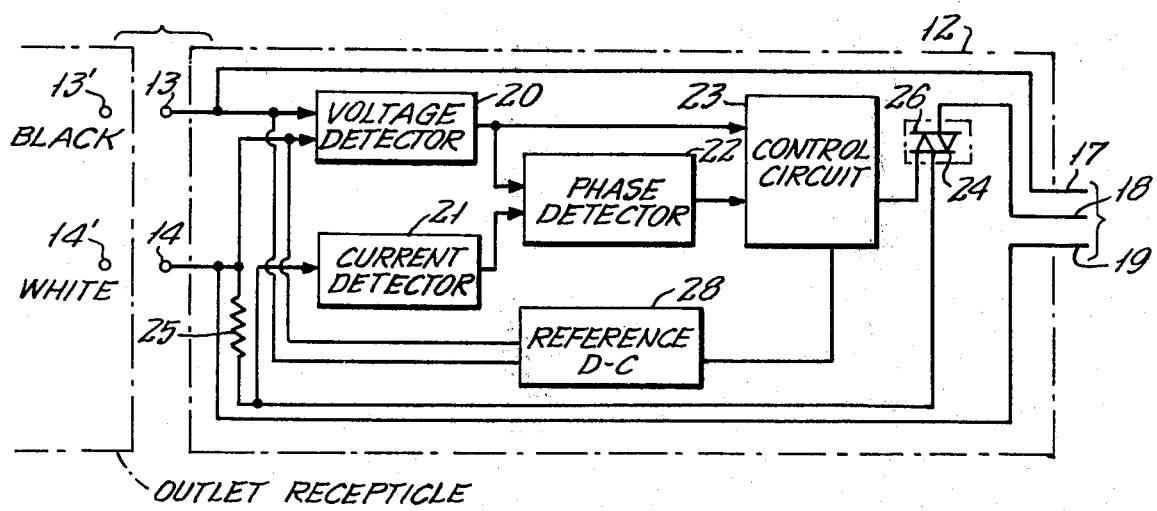

FIGS. 4 and 5 correspond respectively to FIGS. 1 and 2, to show a modification.

In FIG. 1, the invention is shown in application to a cord set comprising a plug 10 and an elongate flexible cord 11, connected at one end to plug 10 and adapted at its other end for connection to different load components of a utilization device, not shown. Plug 10 comprises a body 12 adapted for ready grasp and manipulation, and body 12 is shown fixedly mounting a three-prong array of standard connector elements, namely, a pair of like spaced parallel prong elements 12-13 and a ground pin 15, the same being adapted for entry in the socket of a conventional a-c power-outlet receptacle (not shown). Prongs 13-14 provide inlet connections, respectively served by the "hot" (or black) wiring to the receptacle and by the "common" (or white) wiring to the receptacle, and pin 15 provides the inlet connection served by "grounded" (or green) wiring to the receptacle. There are at least four insulated flexible conductors in the cable-connected outlet of plug 10. Of these, conductor 16 involves a direct connection to the inlet-ground conductor 15, to establish a means for electrically grounding the frame of the utilization device, such as the steel frame of a washing machine. A second conductor 17 is common to the supply of one terminal for each of two load components of the utilization device, and third and fourth conductors 18-19 respectively serve the other terminal for each of the two load components. Legends in FIG. 1 designate these two different load components as "Load I" (which may be an induction motor) and as "Load II" (which may be an associated heater and control circuitry forming part of the same utilization device as Load I).

FIG. 2 depicts one category of internal construction, for the cord set of FIG. 1. The inlet conductors 13-14-15 are identified alongside the receptacle outlet connections 13'-14'-15' which they are designed to engage, for supply-wiring as indicated by the legends "Black", "White" and "Green". The individual machine-connectable flexible conductors 16 to 19 (of cord 11) are also identified.

For a washing machine as the assumed utilization device, its induction motor may be taken as Load I, which is subject to a wide spread of output-torque demand throughout the machine cycle of operation. With such demand fluctuation, there is a subsiantial period of relatively light load on the motor (e.g., when spin-drying) during which period the motor operates inefficiently, by reason of substantial phase lag of voltage behind current; in periods of greater load, the motor works more nearly to its capacity, and the phase lag materially reduces, making for more efficient consumption of power. To provide for more efficient power consumption during periods of light load, a power-factor controller is incorporated within the confines of plug body 12.

The functional and component details of such a power-factor controller are described in the above-mentioned Nola patents and therefore detail is not needed in the present description. Hence, a simplified block diagram has been adopted for the controller in FIG. 2.

The power-factor controller in FIG. 2 operates from the two inlet connections 13-14 to continuously detect voltage at 20 and current at 21 for operation of a phase detector 22. A control circuit 23 accepts detected phase and voltage outputs, in the context of a locally derived reference d-c voltage to provide control signals to thyristor means 24, which may be a triac device, suitably series-connected with a resistor 25 in the line from inlet conductor 14 to the power-factor controller output line connection (flexible cord conductor 18). The triac 24 may include a heat sink 26 of conductive material, in which case a grounding connection 27 is made to the "green" or inlet-ground conductor 15. As indicated, the machine motor is load-reactive and is supplied by cord conductors 17-18, i.e., such power as is permitted to pass by reason of triac action; this action is one of cutting to zero the supplied voltage, once it achieves a level proportional to detected phase angle, in its rise in each half cycle of supplied voltage; a reference d-c level, derived at 28, provides the base from which the phase-angle proportioned voltage is made available. The triac "on" time is allowed to vary with motor load and, therefore, varies the motor voltage (Load I) to force the applied voltage to remain at an optimized value, suited to the magnitude of the instantaneous load.

While Load I in the FIG. 2 situation is optimally served by the described power-factor controller, Load II in the FIG. 2 situation is essentially resistive and therefore requires no power-factor correction. For this reason, the flexible conductors 17-19 which serve Load II have direct-line connection to inlet conductors 13-14. If such direct-line connection were not available for Load II, and if, for example, Load II were connected in parallel to Load I (as is customary in household and industrial machines), then the connection of both Loads I and II to the power-factor controller output conductors 18-19 would necessarily mean that the phase detector 22 would be sensing something less than the true phase-angle problem, and its output would therefore fail to achieve its optimal power-saving function.

Figure 3:
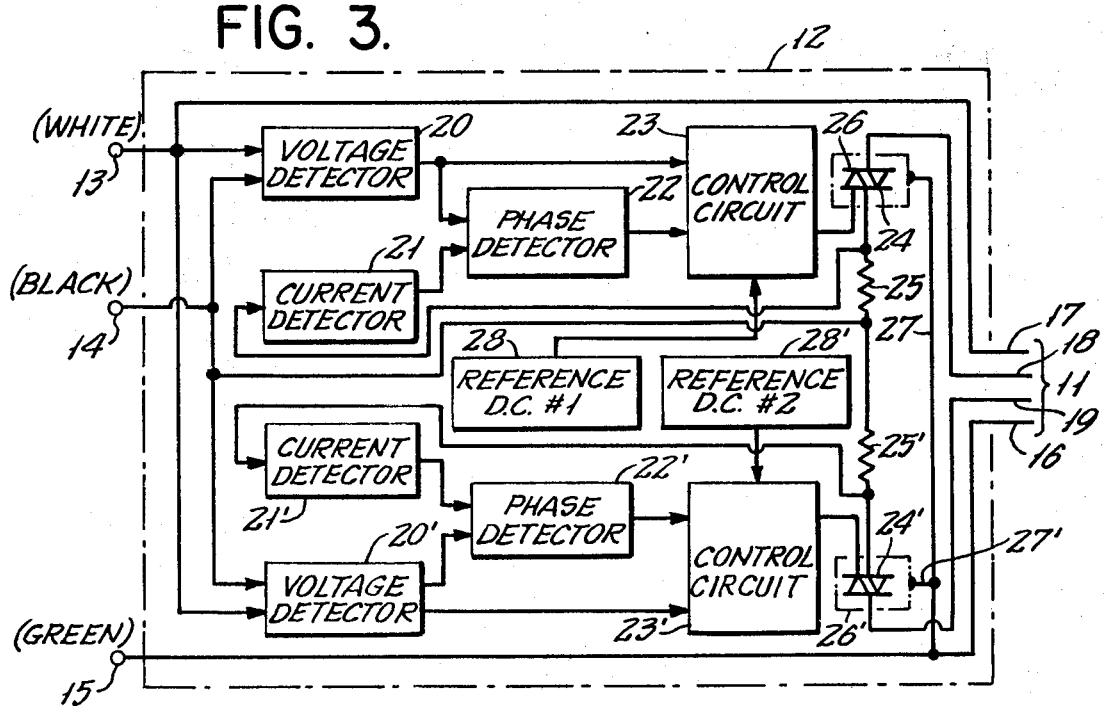
FIG. 3 is a similar block diagram to show a modification.

Certain kinds of utilization device employ two or more different induction motors, operating on different duty cycles. In such case, a single power-factor controller will again fail to achieve optimim voltage-supply correction to the utilization device, if all such motors are parallel-connected, as is customary. FIG. 3 contains two power-factor controllers and illustrates application of the invention for service of such a multiple-motor utilization device, wherein the number of motors is two, i.e., wherein Load I and Load II in FIG. 1 are different induction motors, each with its own different duty cycle, e.g., a compressor motor and a fan motor in a refrigerator machine.

In FIG. 3, the inlet conductors 13-14 are identified with reversed black and white legends, as compared to FIG. 2, in order to indicate the interchangeability of these conductors, as far as power-factor controller operation is concerned. The circuitry of the first power-factor controller serves first motor-load outlet conductors 17-18, and is precisely as described for FIG. 2, so that the same reference numbers identify corresponding components. The circuitry of the second motor-load outlet conductors 17-19, involves similar components, which are identified by primed notation for corresponding reference numbers. More particularly, the line 17 serves both motor loads in common, and the derived reference d-c voltages at 28-28' serve the respective control circuits 23-23'. Each of the electrically conductive heat sinks 26-26' is connected to the machine-ground terminal 15.

In the device of FIG. 3, each of the power-factor controllers contained within the plug housing 12 operates independently in response to the changing load represented by the induction motor which it serves, so that economies achieved through voltage modification to each motor are unique to that motor's instantaneously sensed requirements. The sum total of the economies is a maximum, achieved by independent accommodation of different duty cycles and load changes.

It will be understood that if the multiple-motor machine served by the FIG. 3 device should have a further identifiable load component which is essentially resistive, then the contents of plug 10 may include a direct-line connection to inlet conductor 14 from an additional (fifth) flexible conductor in cord 11; such connection and fifth conductor are not shown in FIG. 3, but are the complete analogy of the direct-line connection shown in FIG. 2, from flexible conductor 17 to inlet conductor 14.

In the event that the utilization device served by a cord set of the invention does not have a conductive frame, i.e., has a frame which does not require grounding, then of course the flexible conductor 16 is unnecessary and may be omitted from cord 11. Also, in the event that the heat sink associated with the involved thyristor is not electrically conductive, then there is no need for grounding the same. Thus, there can be a circumstance wherein there is no need for the inlet-ground pin 15, and the plug 10 reduces to merely a two-prong device, all other described contents and functions of the circuits of FIGS. 2 and 3 remaining as described and functioning from the line input derived from prongs 13-14, all as shown in FIGS. 4 and 5.

The described embodiments of the invention will be seen to meet all stated objects. When supplied to an OEM application, the device becomes an integral part of the machine sold to the consumer, and plug-in of the machine to a conventional receptacle is no different from conventional practice; yet the advantage of independent power-factor control of the circuit component requiring correction is optimally achieved without internal modification of the machine. The same can be said of the consumer who chooses to retro-fit the described device in his own machine, except that he knows that he is making the retrofit to achieve immediate energy conservation.

While the invention has been described in detail for preferred embodiments, it will be understood that modifications may be made without departure from the scope of the invention.

What is claimed is:

1. As an article of manufacture, an electrical cord set adapted for connection to supply a-c electric power to a utilization device having two different electrical-system components one of which is phase-reactive to load, said cord set comprising a flexible cord having at least four insulated conductors adapted at one end for connection to said utilization device, and a plug unit connected to the other end of said cord, said plug unit having a body with a three-prong inlet-conductor cluster of standard configuration for removable insertion in a conventional single-phase a-c power-outlet receptacle, the standard three-prong configuration providing within said body an inlet-ground connection, an inlet-common connection and an inlet-hot connection, first, second and third of said cord conductors being respectively connected within said body to different inlet connections, and a power-factor controller within said body and having first and second inlet connections respectively connected to said inlet-common and to said inlet-hot connections, said power-factor controller having an output connection to the fourth of said insulated conductors, whereby a phase-reactive system component such as an induction motor may be connected to run under power-factor control via said third and fourth conductors while a differently reactive system component such as an electrical heater and its control circuitry may be connected to run without power-factor control via said second and third conductors.

2. The article of claim 1, in which said power-factor controller includes non-linear thyristor means having a heat sink of electrically conducting material with a grounding connection to said inlet-ground connection.

3. As an article of manufacture, an electrical cord set adapted for connection to supply a-c electric power to a utilization device having two different electrical-system components which have differing characteristics of phase reaction to load, said cord set comprising a flexible cord having at least four insulated conductors adapted at one end for connection to said utilization device, and a plug unit connected to the other end of said cord, said plug unit having a body with a three-prong inlet-conductor cluster of standard configuration for removable insertion in a conventional single-phase a-c power-outlet receptacle, the standard three-prong connection providing within said body an inlet-ground connection, an inlet-common connection, and an inlet-hot connection, first and second of said cord conductors being respectively connected within said body to said inlet-ground connection and to one of said inlet-hot and inlet-common connections, and first and second power-factor controllers within said body, each of said power-factor controllers having first and second inlet connection respectively connected to said inlet-common and to said inlet-hot connections, the first power-factor controller having an output connection to the third insulated conductor and the second power-factor controller having an output connection to the fourth insulated conductor, whereby the second and third conductors may be connected to drive said first system component with first power-factor control and the second and fourth conductors may be connected to drive the second system component with second power-factor control.

4. The article of claim 3, in which each of said power-factor controllers includes non-linear thyristor means having a heat sink of electrically conductive material with a grounding connection to said inlet-ground connection.

5. As an article of manufacture, an electrical cord set adapted for connection to supply a-c electric power to a utilization device having no externally exposed electrically conductive frame material and having two different electrical-system components one of which is phase-sensitive to load, said cord set comprising a flexible cord having at least three insulated conductors adapted at one end for connection to said utilization device, and a plug unit connected to the other end of said cord, said plug unit having a body with a two-prong inlet-conductor pair of standard configuration for removable insertion in a conventional single-phase a-c power-outlet receptacle, the standard two-prong configuration providing within said body a grounded inlet-common connection and an inlet-hot connection, first and second of said cord conductors being respectively connected within said body to the respective prong inlet connections, and a power-factor controller within said body and having first and second inlet connections to the respective prong inlet connections, said power-factor controller having an output connection to the third of said cord conductors, said power-factor controller including thyristor means having a heat sink of electrically non-conductive material.

6. As an article of manufacture, an electrical cord set adapted for connection to supply a-c electric power to a utilization device having no externally exposed electrically conductive frame material and have two different electrical-system components having differing characteristics of phase reaction to load, said cord set comprising a flexible cord having at least three insulated conductors adapted at one end for connection to said utilization device, and a plug unit connected to the other end of said cord, said plug unit having a body wth a two-prong inlet-conductor pair of standard configuration for removable insertion in a conventional single-phase a-c power-outlet receptacle, the standard two-prong configuration providing within said body a grounded inlet-common and an inlet-hot connection, a first of said cord conductors being connected within said body to one of said prong-inlet connections, and said first and second power-factor controllers within said body, each of said power-factor controllers having first and second inlet connections to the respective prong inlet connection, the first power-factor controller having an output connection to the second of said cord conductors, the second power-factor controller having an output connection to the third of said cord conductors, each of said power-factor controllers including thyristor means having a heat sink of electrically non-conductive material.

* * * * *